(12) United States Patent
Lee et al.

(10) Patent No.: US 6,484,172 B1
(45) Date of Patent: Nov. 19, 2002

(54) CONCURRENCY CONTROL METHOD FOR HIGH-DIMENSIONAL INDEX STRUCTURE USING LATCH AND LOCK

(75) Inventors: Jang Sun Lee, Taejon; Jin Soo Lee, Seoul; Hun Soon Lee, Ohkchon-koon; Myung Joon Kim, Taejon; Jae Soo Yoo, Chungju-shi; Seok Il Song, Chungju-shi; Seok Hee Lee, Chungju-shi, all of (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/497,345

(22) Filed: Feb. 3, 2000

(30) Foreign Application Priority Data

Dec. 24, 1999 (KR) .............................. 99-62171

(51) Int. Cl.[7] .............................................. G06F 17/30
(52) U.S. Cl. ................................................ 707/8; 707/3
(58) Field of Search .............................. 707/3, 10, 100, 707/200, 8

(56) References Cited

U.S. PATENT DOCUMENTS

| | | | |
|---|---|---|---|
| 5,717,921 A | 2/1998 | Lomet et al. ............... 707/200 |
| 6,047,281 A | * 4/2000 | Wilson et al. .................. 707/3 |
| 6,381,605 B1 | * 4/2000 | Kothuri et al. ............. 707/100 |
| 6,157,929 A | * 12/2000 | Zamiska et al. ............ 707/200 |

OTHER PUBLICATIONS

Xue Qun Li; King, I. discloses Regression analysis for Rival Penalized Competitive Learning Binary Tree.; Neural Networks, 2000. IJCNN 2000, Proceedings of the IEEE–INNS–ENNS International Joint Conference on, vol.:6, 2000; pp.: 290–295 vol.*

Kornacker, et al.; High–Concurrency Locking in R–Trees; 1995; Proceedings of the 21st VLDB Confrence.

Chen, et al.; A Study of Concurrent Operations on R–Trees; 1997 pp. 1–38.

* cited by examiner

Primary Examiner—Diane D. Mizrahi
(74) Attorney, Agent, or Firm—Jacobson Holman, PLLC (57) ABSTRACT

A concurrency control method for searching the high-dimensional index tree of a database is disclosed. The concurrency control includes: a) adding a root node to the queue and acquiring the shared lock for reinsertion node; b) determining whether the queue is empty or not, fetching a node from the queue and assigning the fetched node as a current node if queue is not empty, releasing the shared lock and terminating the search process if queue is empty; c) acquiring the shared latch in the current node, selecting the lower nodes which are within the query range and adding the selected nodes to the queue if current node is not leaf or to the result set if current node is leaf; and d) returning to the step b).

14 Claims, 11 Drawing Sheets

CONCURRENCY CONTROL METHOD FOR HIGH-DIMENSIONAL INDEX STRUCTURE USING LATCH AND LOCK

FIELD OF THE INVENTION

The present invention relates to a concurrency control method for database systems, particularly for high-dimensional index structures which use a reinsert operation when an insert operation causes a node overflow. More particularly, the present invention relates to a technique by which the entity, deleted in a node of an index tree for reinsert operation, can be searched.

DESCRIPTION OF THE PRIOR ART

Last few years, a similarity search based upon a multidimensional data has been an important field of the database systems. The application areas of the similarity search are widely spread from GIS(Geographical Information System) to medical database systems and multimedia database systems.

One of the fundamental problems is how to efficiently find out objects similar to a given query from a number of multidimensional data sets. The researches about multidimensional index trees have been performed very frequently. And various index structures such as Grid File, Multilevel Grid File, R-Tree, R*-Tree, TV-Tree, X-Tree, SS-Tree, SR-Tree, CIR-Tree and Hybrid-Tree have been proposed. In the multi-user environment of real application, an appropriate concurrency control algorithm for index structures is necessarily needed. Most of index structures are expressed by a tree shape (hereinafter refers to index tree). Each element in an index tree is called as a node, and the node makes up the index tree by a hierarchical structure. The index tree is made by inserting/deleting entries into/from it.

In addition, each node of an index tree is able to have only limited number of entries. It is called an overflow when a node has no space to insert a new entry. When an overflow occurs in a node, reinserting some of the entries one by one into the index tree is able to enhance the performance.

The research of a concurrency control method for existing index tree is primarily about B-Tree for one-dimensional data. However, the research of a concurrency control method for R-Tree, index tree for multidimensional data, has begun recently. The concurrency control algorithms for existing multidimensional index tree can be divided into two classes. One is based upon Lock-Coupling Technique and the other is based upon Link Technique. A Concurrency Control algorithm based upon Lock-Coupling acquires lock in next-visiting nodes before unlocking the current node's lock when traversing the index tree. When the node split is performed or MBR change is reflected, all nodes which relates to these operation should be locked. This method decreases the concurrency performance because one transaction should maintain the locks of many nodes simultaneously on search or insert operation.

A concurrency control algorithm based upon Link Technique is proposed to solve this problem. The previous research proves that the concurrency control method based upon Link Technique has a better performance than that based upon Lock-Coupling Technique. The concurrency control algorithm based upon Link Technique need not perform Lock-Coupling. Namely, the Link Technique has only to acquire lock in one node during the traversing of the tree. However, performing MBR change or split operation still need to acquire locks in many nodes simultaneously.

The basic concept of Link Technique is to connect all nodes on each level via rightward-pointing links and to check and compensate the split of a lower node, which is not reflected upon the upper node, without performing lock-coupling on search operation.

$R^{Link}$-Tree modifies and compensates the Link Technique of the $B^{Link}$-Tree because of the structural difference between R-Tree and B-Tree. The modification introduces NSN(Node Sequence Number) and allocates it to each node. And the modification changes the entry structure from <MBR, child-page> to <MBR, child-page, NSN>. The NSN is increased when a new node is made, and each new node is given the NSN of the old node, and the old node is given an increased NSN. And then, the new node is linked to the rightward of the old node. Therefore, the search operation, when traversing the tree, can determine whether the child node is split or not by the value of NSN. The search process, which memorizes the NSN recorded in the entry <MBR, child-page, NSN> of the parent node, moves rightward when the value of NSN of child node is larger than the memorized NSN. When the search process meets the node having the same NSN to the memorized NSN, it stops moving sideward and proceeds to perform a search of lower nodes.

This method has some drawbacks. First, when some transactions perform the operation of changing the tree structure (i.e. node split and MBR change), the nodes of two or more levels should be held locks at the same time, and consequently the search process can be delayed during I/O operations. Second, since the data structure of entry changes into <MBR, child-page, NSN>, the additional information, NSN lowers the efficiency of storage space and consequently the fan out of a non-leaf node is decreased.

The improved method solves the problem which wastes the storage space owing to the added NSN to the data structure of the entry. The improved method also allocates NSN to each node like $R^{Link}$-Tree, checks the split through the rightward-pointing link, and determines whether to go on making tours through the rightward-pointing link. However, unlike $R^{Link}$-Tree, the improved method provides the means to determine whether the lower node splits without recording the NSN of the lower node in the entry of the non-leaf node. Allocating NSN by using a global counter enables this.

When a node splits, the new node is given the NSN of the old node, and the old node is given the new NSN. And then, the operation of traversing the tree memorizes the value of the global counter of visited node. The operation of traversing the tree compares the NSN of the current node and the memorized value of the global counter when visiting the lower node and concludes that the split is not reflected on the upper node if the NSN of the current node is larger. The search operation stops moving to neighbor nodes when it meets the node having smaller NSN than the memorized NSN of the global counter and continues making tours to lower nodes. However, this method has a problem. The split of node using a global counter should acquire lock in the upper node before the split of the current node and proceed to split. Besides, it should not release the locks of the nodes which relate to the split operation until the split operation is terminated for the purpose of recovery.

SUMMARY OF THE INVENTION

Therefore, an object of the present invention is to provide the method for preventing the problem of lowering the efficiency of the storage space due to the NSN included in the entry of the leaf node by using an LSN as a global counter, and to provide the method for the search operation to refer to the specified node(the reinsertion node) which stores the deleted entries from the tree for the purpose of the reinsert operation.

Another object of the present invention is to provide the method for the lock in the index node not to affect the search operation at all by mixing latch and lock.

A further another object of the present invention is to provide a high searching performance because the present invention acquires only shared-mode latch (hereinafter refers to shared latch) in the visiting node during the search operation and a delay due to the lock of the insert or delete operation doesn't occur.

In accordance with an aspect of the present invention, there is provided a method for searching a high-dimensional index tree of a database, wherein the concurrency of the database can be controlled, comprising the steps of: a) adding a root node to the queue and acquiring the shared lock for reinsertion node; b) determining whether the queue is empty or not, fetching a node from the queue and assigning the fetched node as a current node if queue is not empty, releasing the shared lock and terminating the search process if queue is empty; c) acquiring the shared latch in the current node, selecting the lower nodes which are within the query range and adding the selected nodes to the queue if current node is not leaf or to the result set if current node is leaf; d) returning to the step b).

In accordance with an aspect of the present invention, there is provided a method for inserting an entry to the high-dimensional index tree of a database, wherein the concurrency of the database can be controlled, comprising the steps of: a) searching a leaf node to which a new entry is inserted; b) determining whether an insert for the new entry to the searched leaf node causes any overflow; c) when the result of the step b) is positive, acquiring a tree lock, performing the process for the overflow of the leaf node and then releasing the tree lock; and d) when the result of the step b) is negative, inserting the new entry to the leaf node, acquiring a tree lock changing a MBR and releasing the tree lock.

In accordance with an aspect of the present invention, there is provided a computer readable medium having computer-executable instructions stored thereon, for performing a method for searching the high-dimensional index tree of a database, wherein the concurrency of the database can be controlled, the method comprising the steps of: a) adding a root node to the queue and acquiring the shared lock for reinsertion node; b) determining whether the queue is empty or not, fetching a node from the queue and assigning the fetched node as a current node if queue is not empty, releasing the shared lock and terminating the search process if queue is empty; c) acquiring the shared latch in the current node, selecting the lower nodes which are within the query range and adding the selected nodes to the queue if current node is not leaf or to the result set if current node is leaf; d) returning to the step b).

In accordance with an aspect of the present invention, there is provided a computer readable medium having computer-executable instructions stored thereon, for inserting an entry to the high-dimensional index tree of a database, wherein the concurrency of the database can be controlled, the method comprising the steps of: a) searching a leaf node to which a new entry is inserted; b) determining whether an insert for the new entry to the searched leaf node causes any overflow; c) if the result of the step b) is positive, acquiring a tree lock, performing a process for the overflow of the leaf node and then releasing the tree lock; and d) if the result of the step b) is negative, inserting the new entry to the leaf node, acquiring a tree lock, changing a MBR and releasing the tree lock.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

When a node overflows, the recent multidimensional index trees(R*-Tree, TV-Tree, X-Tree, SS-Tree, CIR-Tree) select some entries in the node and reinsert one by one into the index tree. The entries selected for reinsert operation can not be searched. Generally, the reinsert period is a very long time. If the entries being reinserted can not be searched during this period, then it will cause a serious problem.

The present invention relates to an effective concurrency control method for a high-dimensional index tree. The concurrency control method records the entries deleted for reinsert operation in reinsertion node so that the deleted entries can be searched during the reinsert operation.

The present invention is based upon the Link Technique used in the $R^{Link}$-Tree. Namely, the present invention uses a global counter, allocates NSN, and consequently prevents the problem that the NSN included in the non-leaf node lowers the efficiency of storage space. However, the present invention, unlike the previous method, provides the method to use LSN as a global counter. The LSN has the characteristic of monotonously increasing like the NSN and never decreasing.

During insert and delete operation which may cause the structure modification of the tree, the $R^{Link}$-Tree using the previous Link Technique should lock the index tree in order to make sure the consistency of the tree because of the structural characteristic of R-Tree series. Without locking in the index node, the insert or delete operation performing in the subtree of the node doing the reinsert operation, can lose the path when the insert or delete operation tries to change the MBR information due to the insert or delete operation going up the tree.

The present invention mixes lock and latch to solve the problem of path loss. The latch for the node of index tree synchronizes the transactions (or processes) when the transactions visit a node of index tree, and makes sure the physical consistency of the node. The present invention acquires shared lock in all nodes which the transaction visits when making tours to lower nodes for insert and delete operation, and releases the shared lock when the transaction ends. The problem of path loss can occur when a reinsert occurs while the transaction goes up the tree and tries to change the MBR due to insert or delete operation. Therefore, the present invention requests to acquire exclusive-mode lock (hereinafter exclusive lock) in a node to be reinserted before the reinsert operation in order to prevent the problem of path loss due to the reinsert operation. And without acquiring exclusive lock the present invention doesn't perform reinsert operation but performs split operation. According to the present invention, the lock in index node doesn't affect the search operation. According to the present invention, the search operation acquires shared latch in a node to approach and consequently, the delay due to the lock of insert or delete operation doesn't occur. According to the present invention, the lock of root node (hereinafter refers to root lock) in index tree has special meaning. The root lock is used to embody tree lock. The concurrency control method, according to the present invention, performs in serial the overflow operation (includes reinsert or split operation) and MBR change operation. The tree lock is used to perform these operations in serial. Namely, when a transaction meets a node overflow during insert operation, the transaction acquires tree lock in exclusive-mode prior to treating the overflow. When the tree lock is acquired, the other transaction, while the transaction performs, does not perform but wait even if overflow occurs or the MBR changes. Other insert operations which do not cause the overflow or the MBR change and search operations can perform without acquiring tree lock.

The present invention provides a concurrency controlled reinsert operation by using a reinsertion node. The entries deleted from the tree are recorded in a region for reinsert, and can be referenced by the search operation. The present invention records the deleted entries in a specific node (i.e. reinsertion node) and the search operation refers the deleted entries. According to the present invention, each index tree has only one reinsertion node. And so the overflow or the MBR change operation cannot occur at the same time, i.e., only one can occur at one time. Namely, two or more reinsert operation cannot occur simultaneously.

The present invention guarantees that the transaction performing reinsert operation holds latch in a node of one level at most. The NSN of node is set using a global counter. However, since the overflow or the MBR change operation can not occur at the same time, the parent node need not acquire latch in advance for the split operation. This prevents the delay time from being longer during the search operation.

Hereinafter, the preferred examples of the present invention will be explained in more detail with reference to the accompanying drawings.

Figure 1:
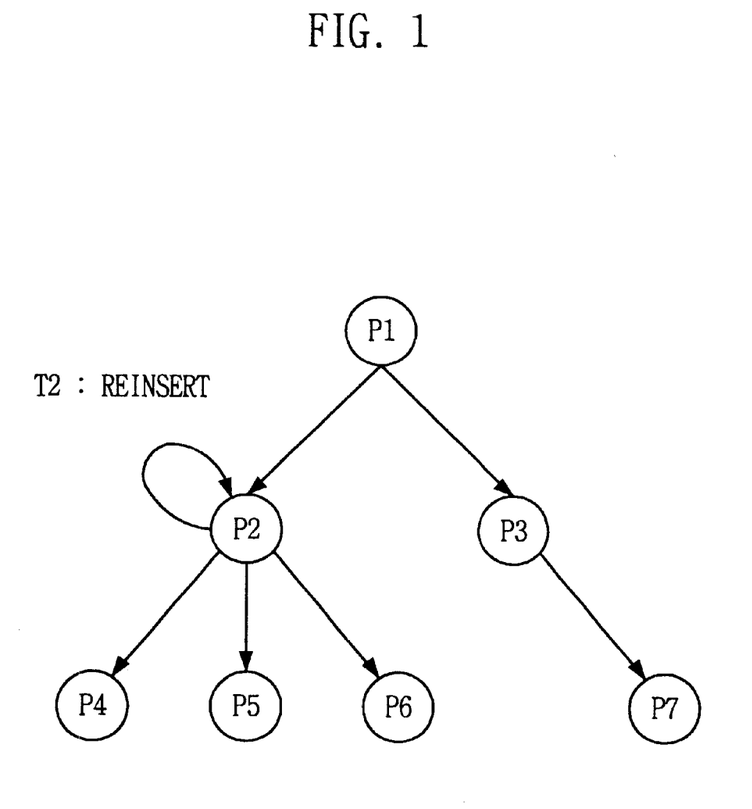
FIG. 1 illustrates the tree structure for explaining the problem of path loss when performing the insert, delete, and reinsert operation simultaneously in accordance with a preferred embodiment of the present invention.

FIG. 1 illustrates the tree structure for explaining the problem of path loss when the insert, delete, and reinsert operation are performed simultaneously in accordance with a preferred embodiment of the present invention.

Referring to FIG. 1, it shows the path loss in transaction T1, T2, and T3. Transaction T1 inserts a new entry into node P4, and approaches to node P2 to modify the entry for node P4. Transaction T2 performs reinsert operation for node P2 and deletes the entry for node P4. Transaction T1 cannot find the entry for P4 in node P2, and results to path loss.

Figure 2:
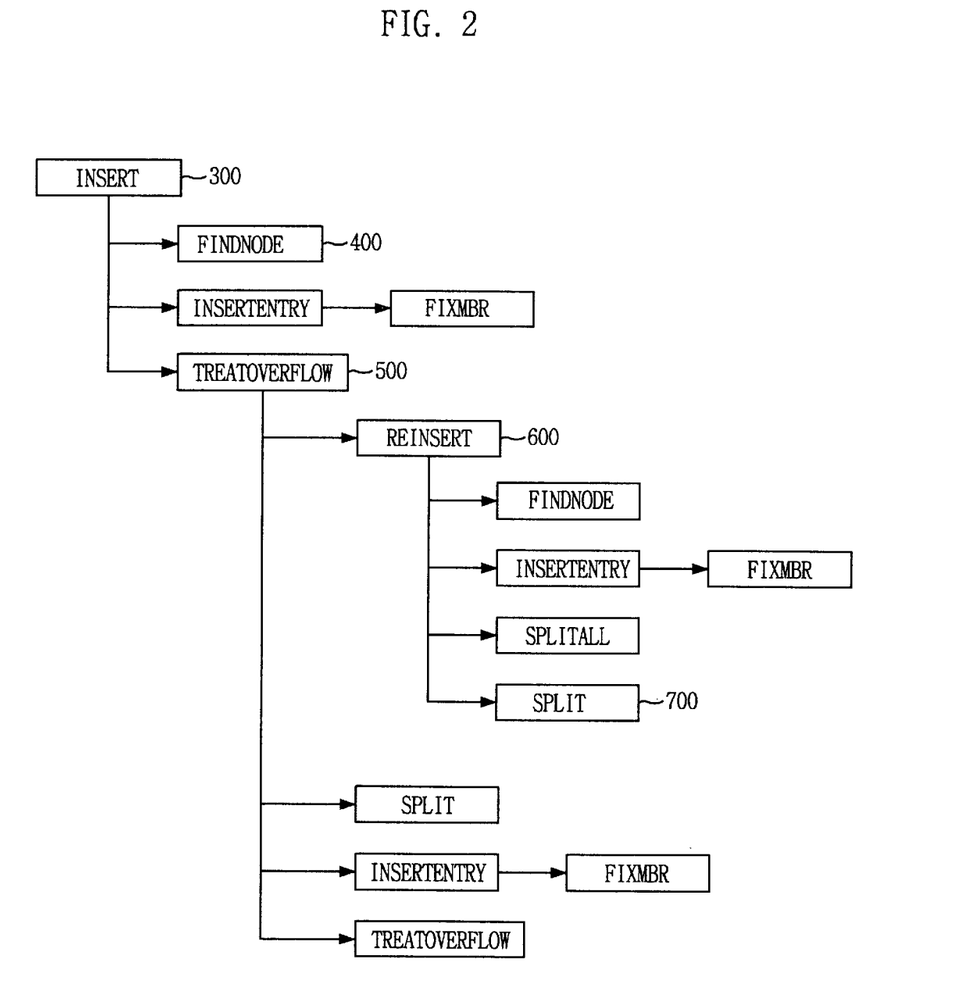
FIG. 2 is a block diagram showing the subroutines, components of the insert operation, in accordance with a preferred embodiment of the present invention.

FIG. 2 is a block diagram for showing the operations, components of the insert operation in accordance with a preferred embodiment of the present invention.

Referring to FIG. 2, the insert 300 operation comprises FindNode 400, TreatOverflow, Reinsert 600, Split 700, SplitAll and FixMBR operations.

The FindNode 400 operation has the function to find out the appropriate node for the insert of entry. The TreatOverflow operation 500 has the function to judge whether to perform split operation or to perform reinsert operation, and performs this operation. The reinsert operation 600 is a function to be called when the TreatOverflow operation 500 treats an overflow as a reinsertion. The function inserts the reinsertion entries in an overflowed node into an index tree. The SplitAll operation in the reinsert operation is a function to be called to split when an overflow occurs during the reinsert operation. The SplitAll operation in the reinsert operation is the same as the split operation 700 except that the SplitAll operation doesn't acquire locks. The reason that the SplitAll operation doesn't acquire locks is that the SplitAll operation already gets lock because the SplitAll operation occurs during the reinsert operation.

Figure 3:
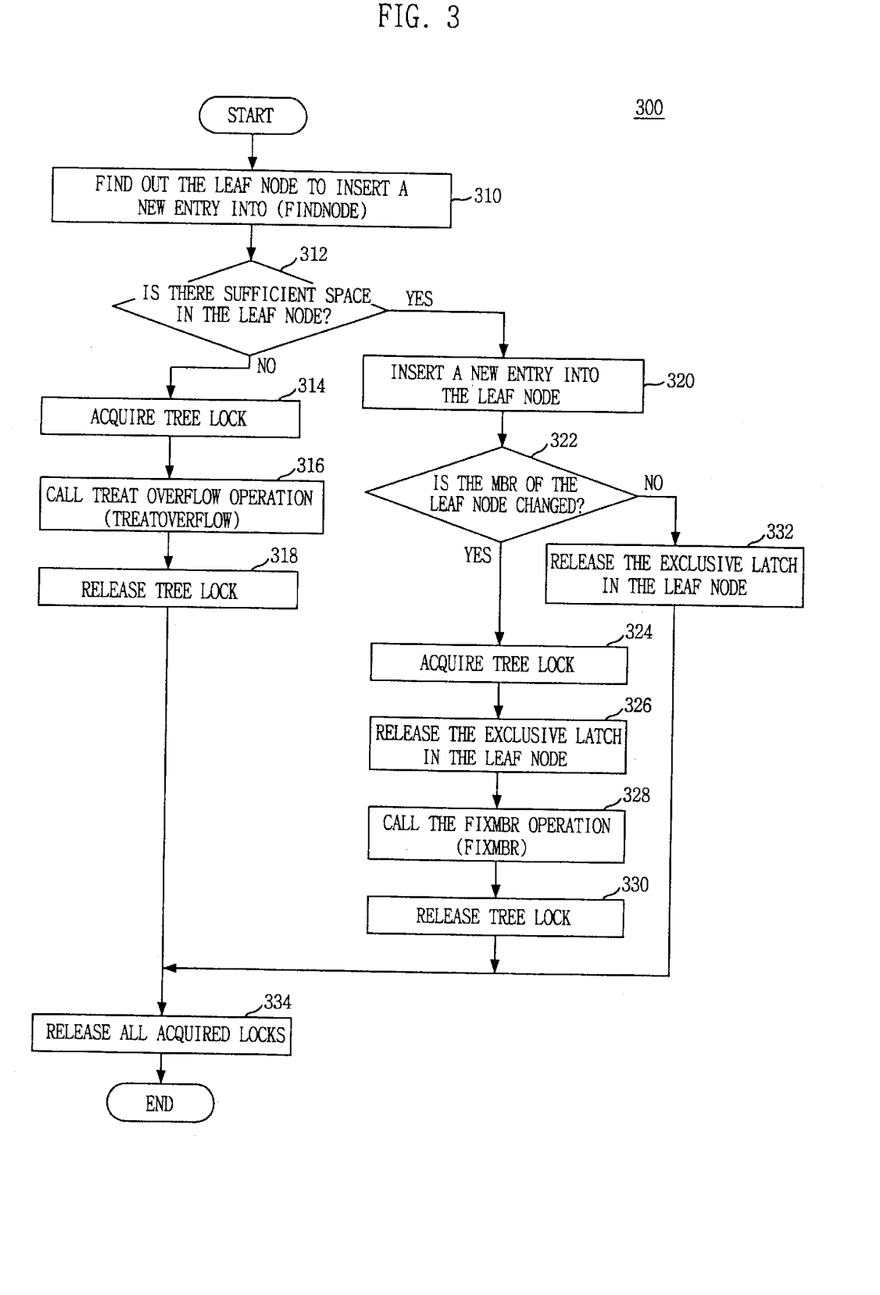
FIG. 3 is a flowchart for explaining the operation of the Insert process in accordance with a preferred embodiment of the present invention.

FIG. 3 is a flowchart for explaining the operation of the insert process in accordance with the preferred embodiment of the present invention.

Referring to FIG. 3, the insert operation begins with finding a leaf node to insert a new entry into (FindNode 310). The step 312 judges whether the found leaf node has a sufficient space to insert a new entry into or not. When the leaf node has not enough space, the step 314 acquires tree lock, and the step 316 performs TreatOverflow operation. At step 318, the tree lock is released. When the found leaf node has sufficient space, the following processes continue. The process continues to inserts new entry into the leaf node. The step 322 judges whether the MBR of the leaf node changed or not at step 320. When the MBR is changed, tree lock is acquired at step 324. The process continues to step 326 releasing the exclusive-mode latch (hereinafter exclusive latch) in the leaf node. FixMBR operation is performed at step 328, and then the tree lock is released at step 330. All acquired locks is released at step 334 and ends. When the MBR is not changed, the process releases the exclusive latch in the leaf node at step 332 and does the all acquired locks at step 334 and ends.

Figure 4:
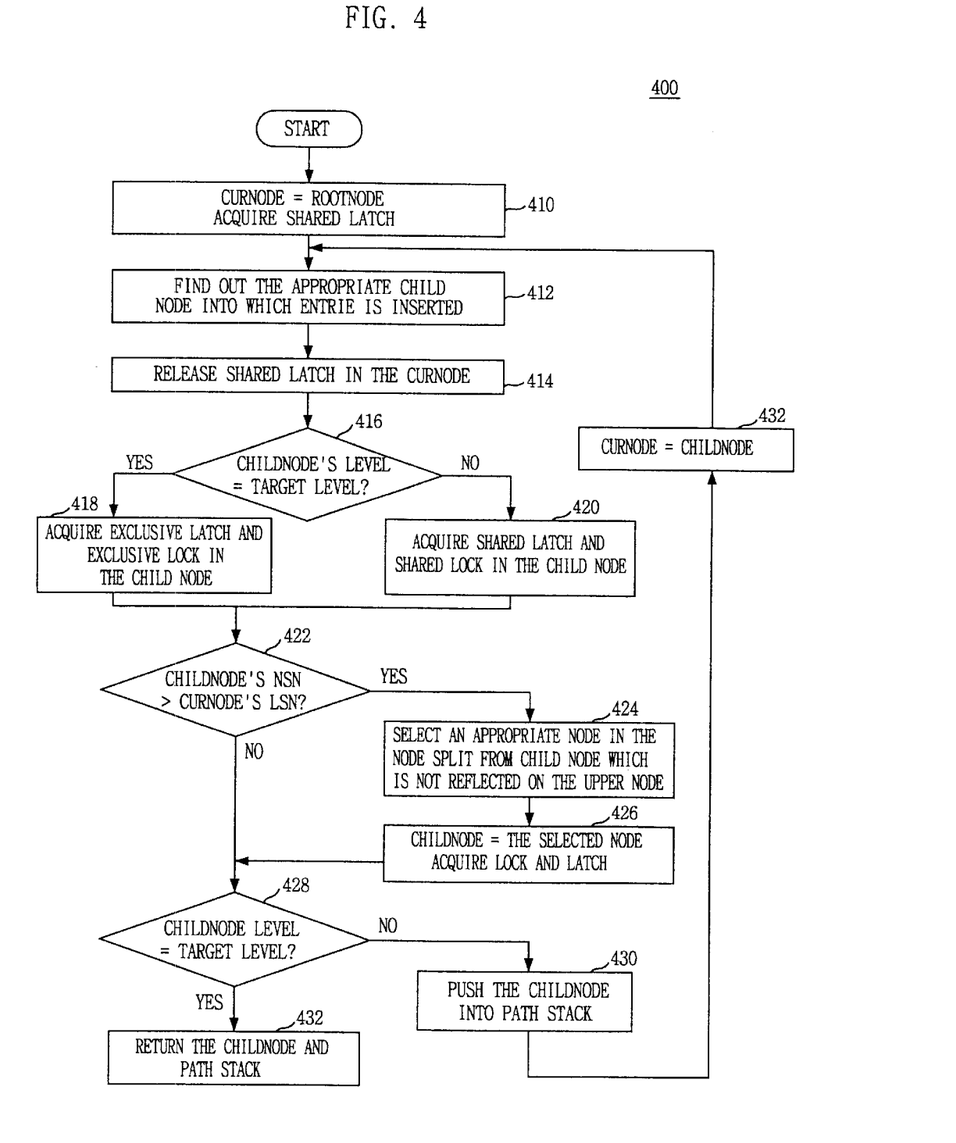
FIG. 4 is a flowchart for explaining the operation of the FindNode process, which finds a node, one operation of the Insert process in accordance with a preferred embodiment of the present invention.

FIG. 4 is a flowchart for explaining the operation of the FindNode process, which finds a node, one operation of the Insert process in accordance with a preferred embodiment of the present invention.

Referring to FIG. 4, the method provides the method to find out the appropriate node for inserting the new entry. The step 410 sets the CurNode(current node) to be RootNode (root node) and acquires shared latch in the CurNode. The step 412 finds out the appropriate child node into which new entry is inserted, and the step 414 releases the shared latch in the CurNode. The step 416 judges whether the level of the ChildNode is the same as the target level. When it is same, the step 418 acquires exclusive latch and exclusive lock in the ChildNode. When it is not the same, the step 420 acquires shared latch and shared lock in the ChildNode. The step 422 judges whether the NSN of the ChildNode is greater than the LSN of the CurNode. When it is greater, the step 424 selects an appropriate node in the node split from the ChildNode which is not reflected on the upper node. In step 426, the selected node is assigned to ChildNode, and the process acquires an exclusive latch and exclusive lock or shared latch and shared lock). Acquiring latch and lockmode is the same as the result of the step 416. The process continues to step 428 to determine whether the ChildNode's level is equal to the target level. When it is not equal, at step 430, the ChildNode is pushed into path stack, and at step 432, the CurNode is assigned to ChildNode. And the process goes back to the step 412. If the ChildNode's level is equal to the target level, the process proceeds to step 432 at which the process returns the ChildNode and Path stack.

Figure 5:
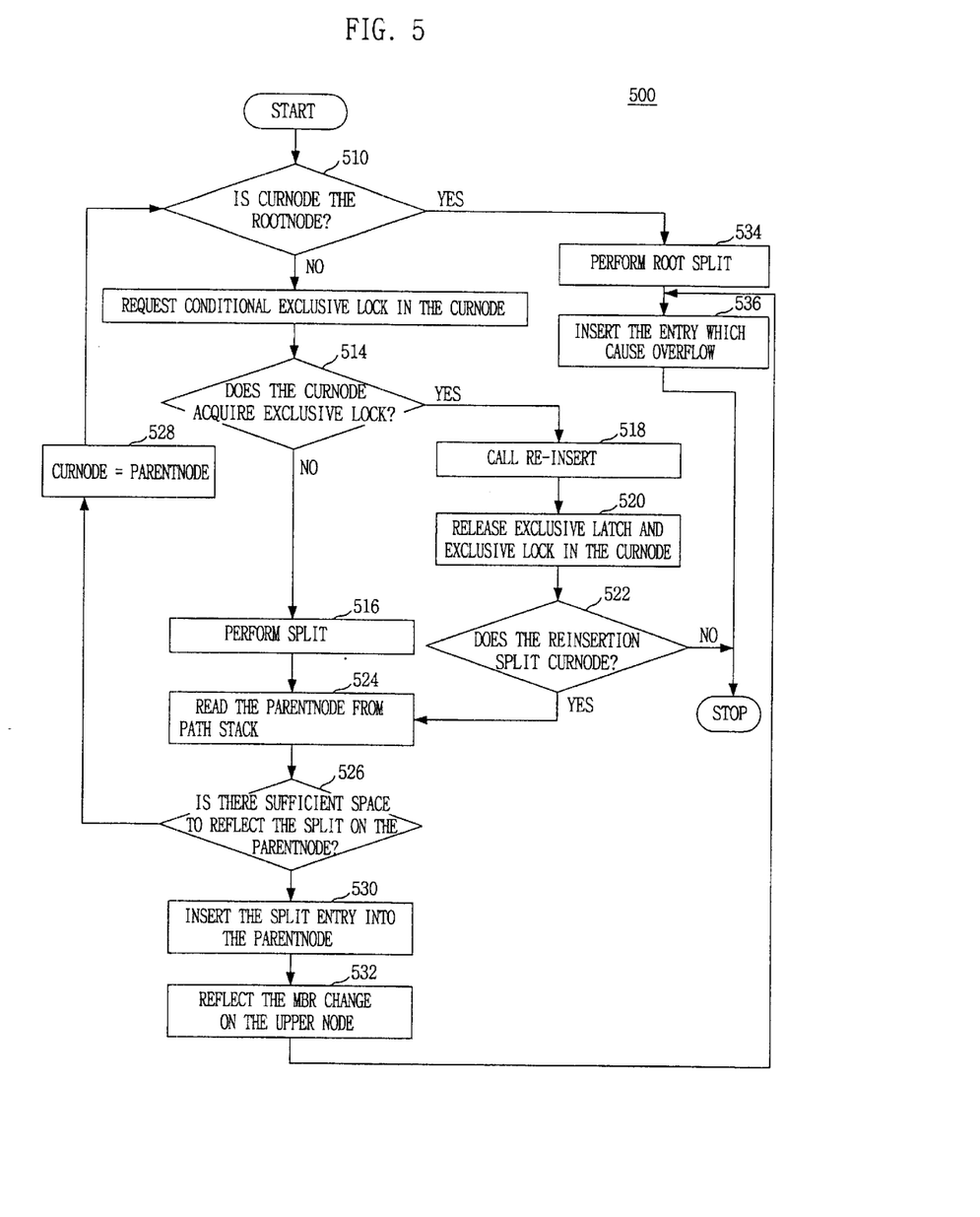
FIG. 5 is a flowchart for explaining the operation of the TreatOverflow process, which treats the overflow of a node, one operation of the Insert process in accordance with a preferred embodiment of the present invention.

FIG. 5 is a flowchart for explaining the operation of the TreatOverflow process which treats the overflow of a node, one operation of the Insert process in accordance with a preferred embodiment of the present invention.

Referring to FIG. 5, the TreatOverflow operation 500 provides the method to perform when a node has not enough space for new entry. It is determined whether is the root node or not at step 510. When the CurNode is the root node, root split is performed at step 534, and the entry which cause the overflow is inserted at step 536. When the CurNode is not the root node, the process continues to request conditional exclusive lock in the CurNode at step 512. Then, the process goes to step 514 to determine whether the CurNode acquires exclusive lock. When the exclusive lock is acquired, the process continues to step 518 calling the reinsert operation 600 and then goes to step 520 in which the exclusive latch and the exclusive lock in the CurNode are released. Subsequently, in step 522 the process determines whether the reinsert operation splits the CurNode. If the result of step 522 is positive, the process goes to step 524, otherwise the process stops. When it didn't acquire the exclusive lock in step 514, the step 516 calls the Split operation 700. All the overflows in the leaf node continue to reinsert operation because the leaf node acquires exclusive lock during the FindNode operation 400. The transaction doesn't perform the reinsert operation but performs the split operation in the non-leaf node while the other transaction performs the insert or delete operation in the subtree of the non-leaf node. When the reinsert operation 600 is terminated, the next step to be performed depends upon how the reinsert operation 600 finished. When the CurNode doesn't overflow during the reinsert operation 600, the process stops. When the CurNode overflows during the reinsert operation 600, in step 524 the ParentNode is read from the path stack. Then, at step 526, it is determined whether there is sufficient space to reflect the is split of CurNode on the ParentNode or not. If there is the sufficient space, at step 530, the split new entry is inserted into the ParentNode. Then the MBR change is reflected on the upper node at step 532.and the entry which cause the overflow is inserted at step 536, and the process stops. When there is no sufficient space, the process proceeds to step 528 at which ParentNode is assigned to the CurNode, then the process goes back to step 510.

Figure 6A:
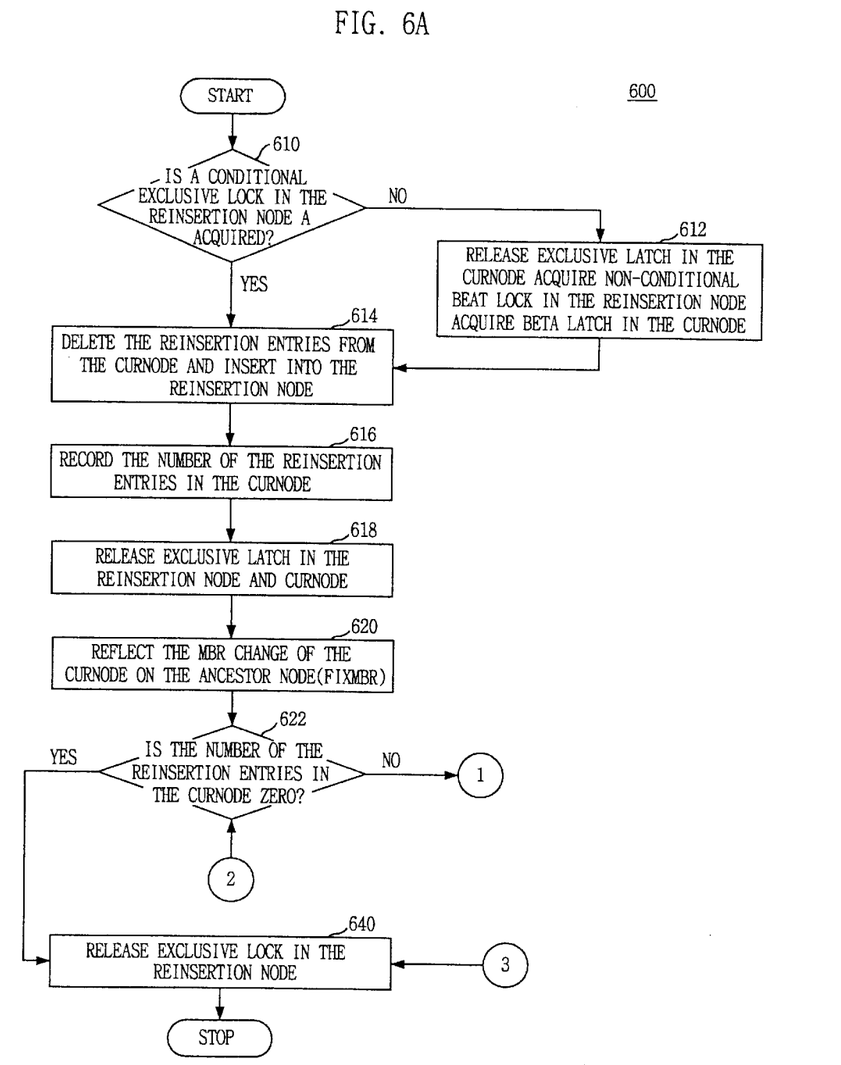
FIG. 6 is a flowchart for explaining the operation of the Reinsert process, one operation of the Insert process in accordance with a preferred embodiment of the present invention.
Figure 6B:
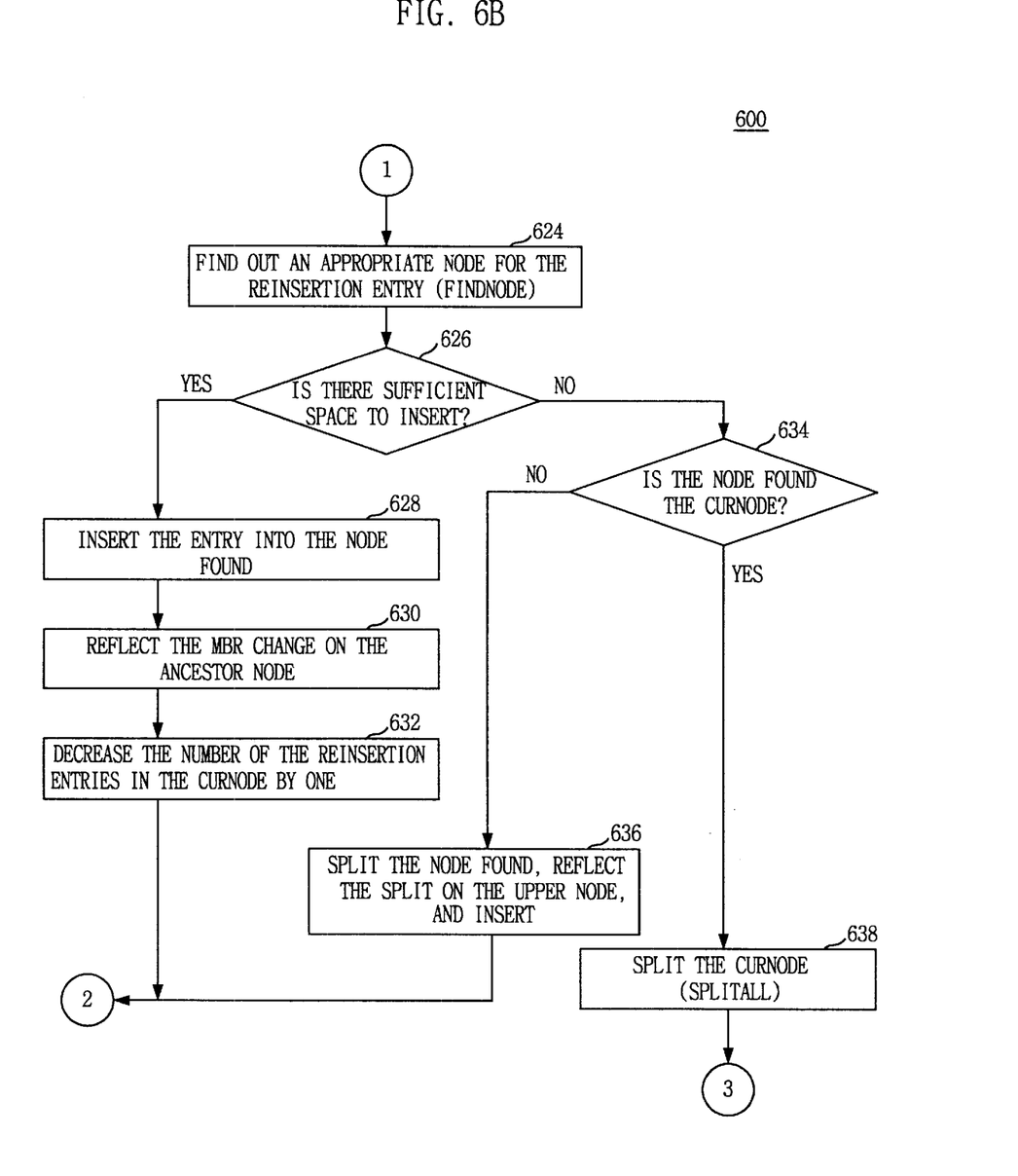

FIG. 6 is a flowchart for explaining the operation of the Reinsert process, one operation of the Insert process in accordance with a preferred embodiment of the present invention.

Referring to FIG. 6, at step 610, the process requests a conditional exclusive lock in the reinsertion node and then it is determined whether requested lock is acquired or not. If the requested lock is acquired, the process deletes the reinsertion entries from the CurNode and inserts into the reinsertion node at step 614. On contrary, if the requested lock is not acquired, the process proceeds to step 612 releasing exclusive latch in the CurNode and acquiring non-conditional exclusive lock in the reinsertion node and exclusive latch in the CurNode, and then the process goes to step 614. In step 616, the number of the reinsertion entries is recorded in the CurNode. The number plays a role as a counter for inserting one by one the reinsertion entries into the index tree. The first record in the reinsertion node saves the level on which the reinsertion is occurring, node identifier and the MBRs of the reinsertion entries. Then, the exclusive latch is released in the reinsertion node and the CurNode at step 618. Subsequently, the MBR change of the CurNode is reflected on the ancestor node (FixMBR) in step 620. In step 622, it is determined whether all of the deleted entries are reinserted into the index tree. The judgment of the step 622 can be done by checking the number of reinsertion entries in the CurNode is zero or not. If the result of step 622 is positive, the process goes to step 640, the process releases exclusive lock in the reinsertion node and stops. If the result of the step 622 is negative, the process goes to step 624, the process found out an appropriate node for the reinsertion entry (call FindNode operation). In step 626, it is determined whether there is sufficient space to insert or not. If the result of step 626 is positive, the process inserts the entry into the found node in step 628. In step 630, the MBR change is reflected on the ancestor node. In step 632, the process decreases the number of the reinsertion entries in the CurNode by one, and the process goes to the step 622. If the result of the step 626 is negative, the process goes to step 634. In step 634, it is determined whether the found node is the CurNode or not. If the result of step 634 is positive, the step 638 call the SplitAll operation in order to split the CurNode. Namely, when the CurNode overflows again after the reinsert operation, the next step split the CurNode. All overflows during the reinsert operation leads to split through the SplitAll. Then, the process releases exclusive lock in the reinsertion node and stops. If the result of step 634 is negative, the process splits the node found, reflects the split on the upper node, and inserts. Then the process goes to the step 622.

Figure 7:
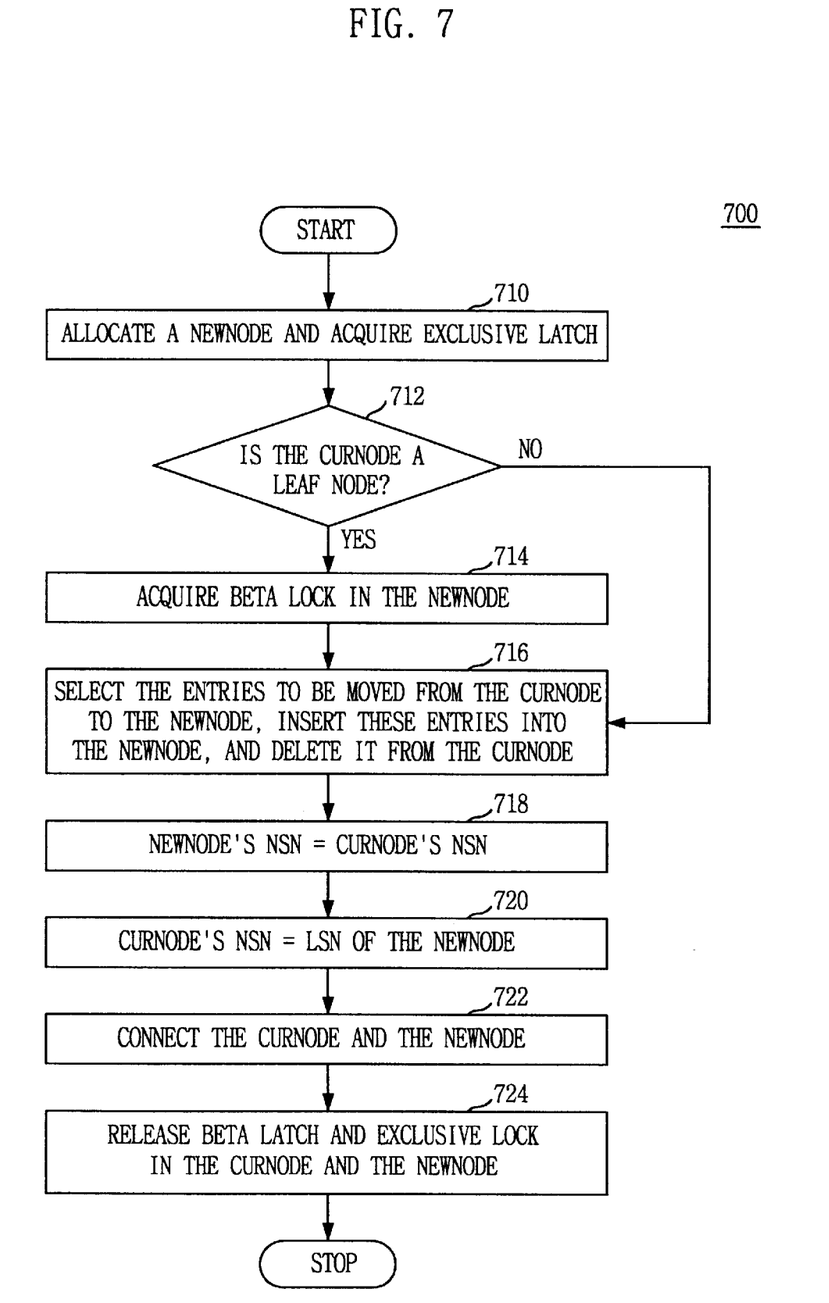
FIG. 7 is a flowchart for explaining the operation of the Split process, which splits a node, one operation of the Insert process in accordance with a preferred embodiment of the present invention.

FIG. 7 is a flowchart for explaining the operation of the Split process, which splits a node, one operation of the Insert process in accordance with a preferred embodiment of the present invention.

Referring to FIG. 7, the split operation 700 allocates a new node(NewNode) and acquires the exclusive latch (step 710).

In step 712, it is determined whether the node to be split is a leaf node or not. When it is a leaf node, in step 714 the process acquires exclusive lock in the NewNode. In step 716, the process selects the entries to be moved from the CurNode to the NewNode, inserts these entries into the NewNode and deletes these entries from the CurNode.

In step 718, the NSN of the CurNode is assigned to the NSN of the NewNode. In step 720, the LSN of the NewNode is assigned to the NSN of the CurNode. In step 722, the process connects the CurNode and the NewNode. In step 724, the exclusive lock and the exclusive latch are released in the CurNode and NewNode, and then the process stops.

Figure 8:
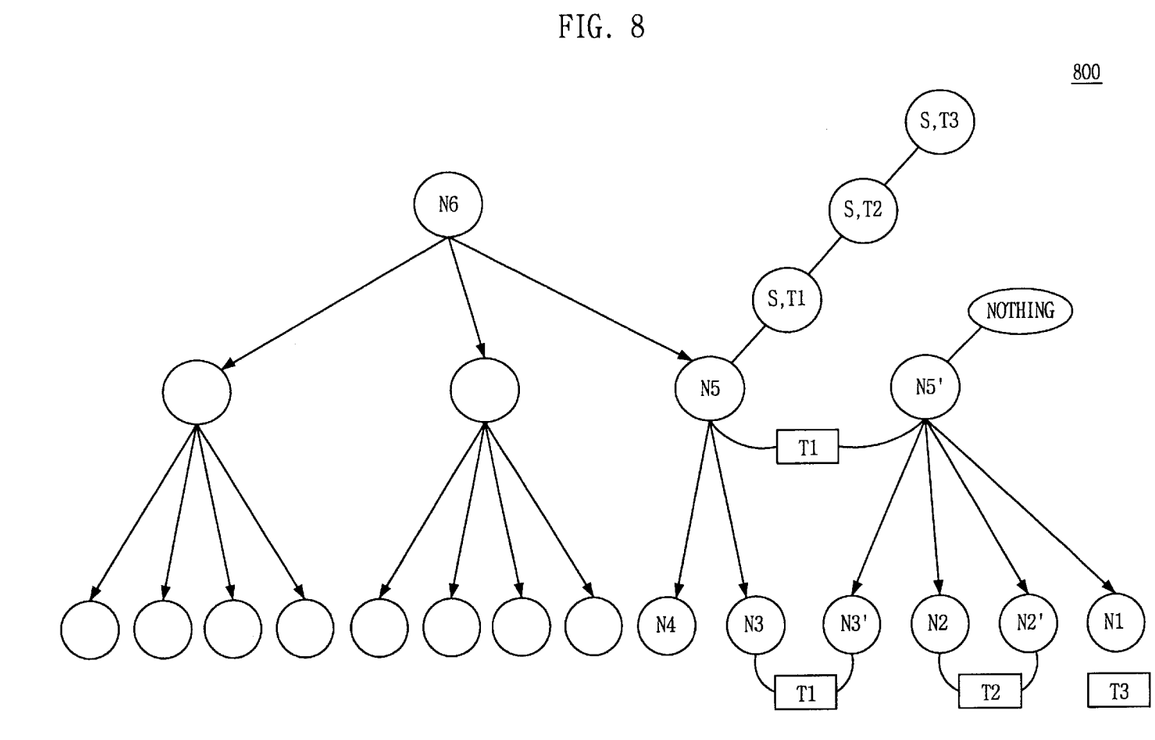
FIG. 8 is a diagram illustrating the tree structure for explaining the process 800 which requests a conditional exclusive lock to the parent node of the path stack during the overflow process of the non-leaf node, in accordance with a preferred embodiment of the present invention.

FIG. 8 illustrates the tree structure for explaining the process 800 which requests a conditional exclusive lock to the is parent node of the path stack during the overflow process of the non-leaf node, in accordance with a preferred embodiment of the present invention.

Referring to FIG. 8, in the process 800 requests the exclusive lock, if the exclusive lock is acquired then reinsert operation is performed. Otherwise, a split is performed.

T1, T2 and T3 represent transactions for inserting entries. First, T1 proceeds through the node N5 to the node N3 for inserting an entry. At this time, T1 acquires the shared lock for the node N5 and acquires an exclusive lock for the node N3. Transactions T2 and T3 also proceed to the node N3 through the node N5 for inserting an entry. Here, for the node N5, T2 and T3 successively acquire the shared lock as is the case of T1. Then, T1 undergoes an overflow during the insertion of the node N3 so as to acquire a tree lock and then perform reinsert operation. Then the node N3 is split. Based on this the upper node N5 should be modified. This modification causes an overflow and thus a conditional exclusive lock for the node N5 is requested for performing the reinsert operation. However, since T2 and T3 has acquire shared lock for the node N5, T1 does not acquire any exclusive lock and performs a split. T1 performs the split of the node N5 and then releases the tree lock so as to complete its flow. Then T3 insert an entry into the node N1 and this insertion cause a MBR change. A tree lock is requested to propagate the MBR change to the upper node. In advance of this, T2 inserts an entry into the node N2. T2 acquires a tree lock and perform an reinsert operation because the insert operation cause an overflow. After the reinsert operation, T2 splits the node N2. Since another overflow occurs during the reflecting the split of N2 on N5', a conditional exclusive lock is again requested to the node N5. However, since T3 maintains the shared lock for the node N5, T2 cannot perform any reinsertion but perform a split. If T3 requests a conditional exclusive lock for the node N5' in this condition, T3 would acquire it and perform a reinsert operation in the node N5'. This, however, may cause the MBR having the changed node N2 to be lost path during the modification of the upper nodes.

Figure 9:
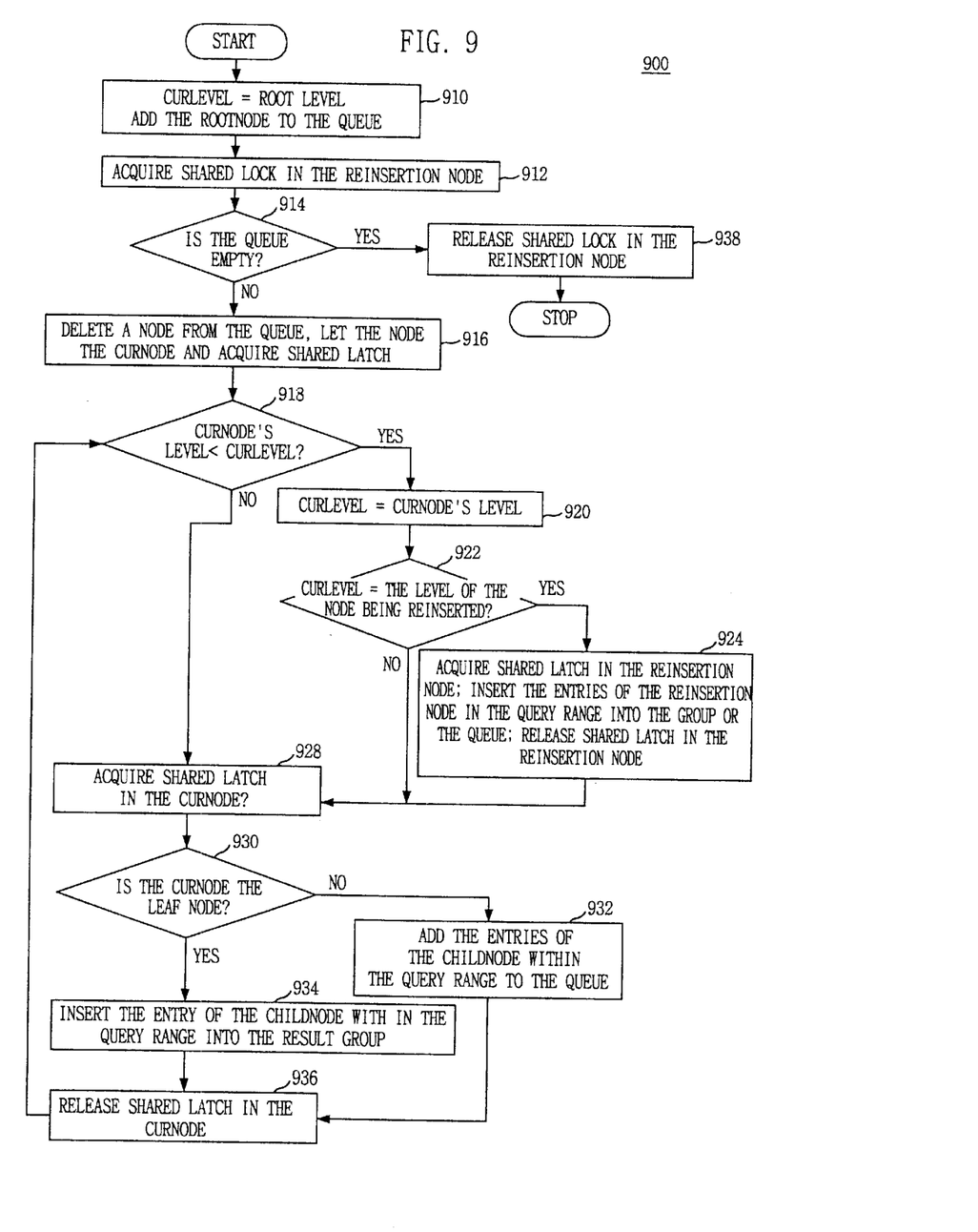
FIG. 9 is a flowchart for explaining the operation of the Search process 900 for the range query in accordance with one preferred embodiment of the present invention.

FIG. 9 is a flowchart for explaining the operation of the Search process 900 for the range query in accordance with one preferred embodiment of the present invention.

Referring to FIG. 9, the search process 900 always maintains the shared latch in only the node existing in one level, and senses the split of child nodes of the currently visited node using a link technique.

In step 910, the level of the root node is assigned to the current level and the root node is added to the queue. In step 912, the shared lock is acquired in the reinsertion node. The process, which performs the range query or the K-nearest neighbor point query, acquires the shared lock in the reinsertion node before performing the search operation. This is for preventing that the reinsertion node is changed during the search. In other words, this is for preventing that the reinsertion entries should be excluded from the object to be searched based on the fact that any change of the reinsertion node can be made during the search. Accordingly, in step 912, the process requests and acquires the shared lock in the reinsertion node. In step 914, it is determined whether the queue is empty or not. If the result of the step 914 is positive, in step 938 the process releases shared lock in the reinsertion node, and the process stops. If the result of the step 914 is negative, a node is fetched as the current node CurNode from the queue and the shared latch is acquired at step 916. At step 918, it is determined whether the level of the CurNode (Level) is less than the current level CurLevel. If the result of the step 918 is positive, the process proceeds to step 920 in which the level of the CurNode is assigned to the current level(CurLevel). At step 922, it is determined whether the CurLevel is equal to the level of the node being reinserted or not. If the CurLevel is equal to the level of the node being reinserted, the shared latch is acquired in the reinsertion node. And then the entries of the reinsertion node within the query range are inserted into the result group if CurNode is leaf or into the queue if CurNode is not leaf, and the shared latch in the reinsertion node is released. Then, the process continue to step 928 acquiring shared latch in the CurNode. If the CurLevel is not equal to the level of the node being reinserted, the process continues to step 928. If the result of the step 918 is negative, the process continues to step 928 in order to acquire shared latch in the CurNode. At step 930, it is determined whether the CurNode is the leaf node or not. The process inserts the entries of the ChildNode within the query range into the result group if CurNode is leaf at step 934 or into the queue if the CurNode is non-leaf at step 932. At step 936, the process releases shared latch in the CurNode. The process goes back to step 914.

Figure 10:
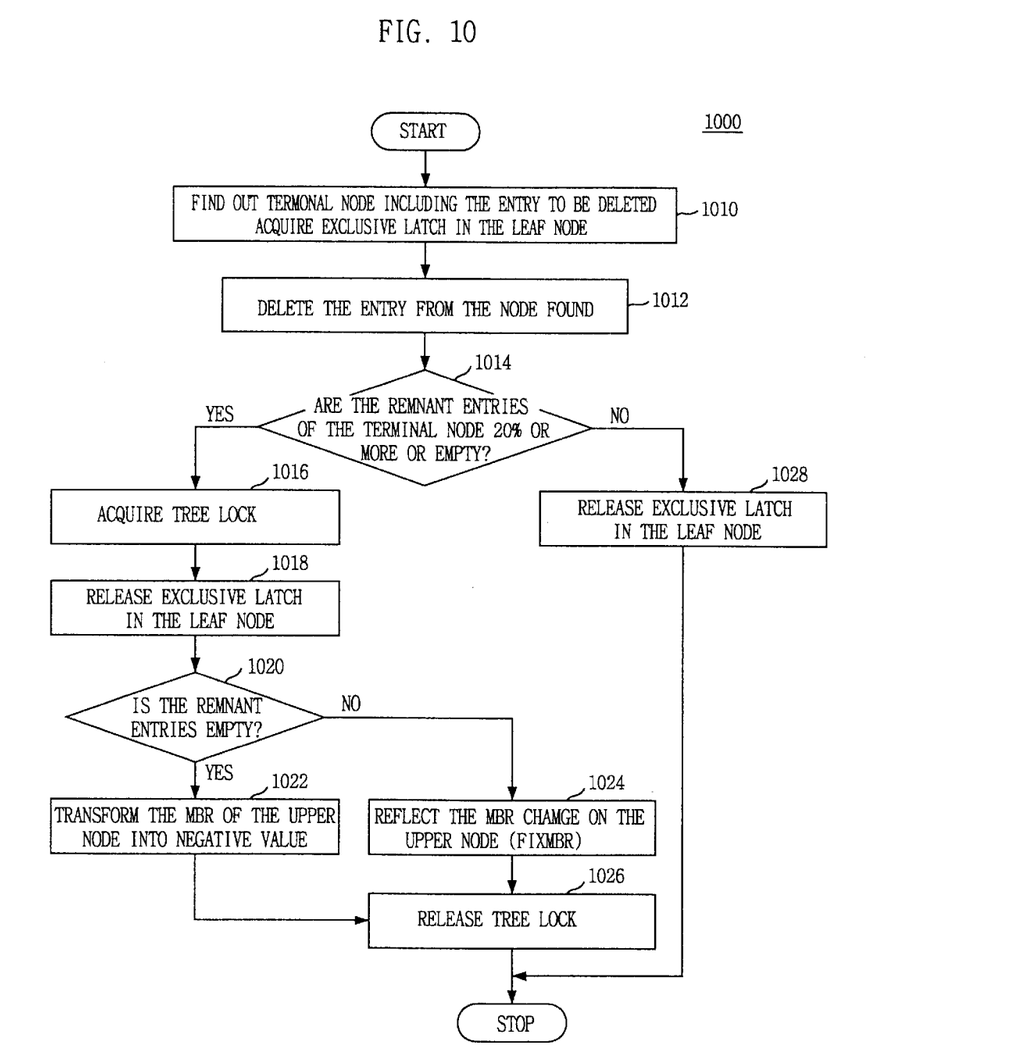
FIG. 10 is a flowchart for explaining the operation of the delete process in accordance with a preferred embodiment of the present invention.

FIG. 10 is a flowchart for illustrating the operation of the deleting process 1000.

Referring to FIG. 10, the deleting process is initiated by step 1010 in which finds out the leaf node, which includes the entry to be deleted, and acquires exclusive latch in the found node. Then, the entry from the node found is deleted in step 1012. In step 1014, a determination is made whether the percent ratio of remnant entries to the entire entries is 20% or more, or there is no remnant entry. If the result of the step 1014 is positive, a tree lock is acquired in step 1016 and the exclusive latch of the leaf node is released in step 1018. If there is no remnant entry, the MBR of current leaf node on the upper node is transformed into negative value in step 1022. In the searching process, the entry having such negative MBR is excluded from the object to be searched. This is for preventing that any vacant node is searched. In the case of the inserting process, FindNode process 400 changes the negative MBR into the positive one so as to consider it as the node capable of being inserted a new entry. This endows the reusability to the vacant node. If there is remnant entry, the process acquires a tree lock and reflects the MBR change on the upper node (call FixMBR operation) in step 1024, the process releases tree lock in step 1026, and the process stops. If the result of the step 1014 is negative, the process releases exclusive latch in the leaf node in step 1028, and the process stops.

As described above, the inventive method for supporting the concurrency of database systems prevents the problem that the efficiency of storage space is decreased due to the inclusion of the NSN in the entry of the non-leaf node by assigning the NSN using LSN as global counting number.

Also, the inventive method uses both the latch technique and the lock technique, so that the lock of the index node cannot give any influence to the search process. Since the search process only acquires the shared latch, the delay for the locks of insertion and deletion does not occur, thereby increasing the searching performance.

In addition, the inventive method allows that the entries deleted from the tree are stored in a specific node (or reinsertion node) for reinsertion and allows the search process to refer the reinsertion node.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for searching a high-dimensional index tree of a database, wherein the concurrency of the database can be controlled, comprising the steps of:
    a) adding a root node to the queue and acquiring the shared lock for reinsertion node;
    b) determining whether the queue is empty or not, fetching a node from the queue and assigning the fetched node as a current node if queue is not empty, releasing the shared lock and terminating the search process if queue is empty;
    c) acquiring the shared latch in the current node, selecting the lower nodes which are within the query range and adding the selected nodes to the queue if current node is not leaf or to the result set if current node is leaf; and
    d) returning to the step b).

2. The method as recited in claim 1, furthers comprising the step of e) maintaining the level information about a node being accessed when traversing the tree so as to search entries within the reinsertion node, determining whether the level information is equal to the level of which the node is being reinserted, and searching the reinsertion node if the level information is changed to the level of reinsertion level.

3. The method as recited in claim 1, further comprising the step of f) moving to a rightward-pointing link of the lower node to select the adjacent node when the split which is not propagated to the upper node is detected.

4. The method as recited in claim 1, further comprising the step of g) controlling a level to be the same with the level of the current node, so that the shared latch is always maintained in only the node existing in one level.

5. A method for inserting an entry to the high-dimensional index tree of a database, wherein the concurrency of the database can be controlled, comprising the steps of:
    a) searching a leaf node to which a new entry is inserted;
    b) determining whether an insert for the new entry to the searched leaf node causes any overflow;
    c) when the result of the step b) is positive, acquiring a tree lock, performing the process for the overflow of the leaf node and then releasing the tree lock; and
    d) when the result of the step b) is negative, inserting the new entry to the leaf node, acquiring a tree lock changing a MBR and releasing the tree lock.

6. The method as recited in claim 5, wherein the step a) includes the steps of:
    a-1) determining whether a child node is a leaf node;
    a-2) if the child node is a leaf node, acquiring an exclusive lock and an exclusive latch for the child node;
    a-3) if the child node is not a leaf node, acquiring a shared lock and a shared latch for the child node;
    a-4) determining whether the NSN composed of LSN of the child node is higher than the estimated NSN composed of LSN of the current node;
    a-5) when the result of the step a-4) is positive, releasing a latch and a lock for the child node, selecting an appropriate node in the node split from the child node which is not reflected on the upper node and acquiring a latch and a lock in the selected node;
    a-6) when the result of the step a-4) is negative, determining whether a child node is a leaf node;
    a-7) when the result of the step a-6) is positive, returning a path stack which stores a path from a root node to the child node and the child node; and
    a-8) when the result of the step a-6) is negative, the current is assigned to child node and return to the step a-1).

7. The method as recited in claim 5, wherein the step c) includes the steps of:
    c-1) determining whether the current node is the root node;
    c-2) when the result of the step c-1) is positive, performing a root split, and when the result of the step c-1) is negative, requesting a conditional exclusive lock for the current node;
    c-3) determining whether the current node acquires an exclusive lock based on the request of the step c-2);
    c-4) when the result of the step c-3) is positive, calling a Reinsert function; and
    c-5) when the result of the step c-3) is negative, calling a Split function.

8. The method as recited in claim 7, wherein the step c-5) further includes:
    c-6) reading out a parent node of the current node from the path stack and then determining whether the propagation of the split to the parent node causes any overflow;
    c-7) when the result of the step c-6) is positive, assigning the current node to parent node, returning to the step c-1); and
    c-8) when parent node has enough space, inserting the split new node into the parent node, propagating the MBR change and completing the overflow process.

9. The method as recited in claim 7, wherein the step c-4) includes the step of:
    c-4-1) compulsorily acquiring an exclusive lock for the reinsertion node;
    c-4-2) deleting the reinsertion entries from the current node and then storing the deleted entries in the reinsertion node;
    c-4-3) calling a function for processing a MBR change such that ancestor nodes of the current node are changed based on the changed MBR of the current node;
    c-4-4) inserting the entries of the reinsertion node into the index tree after the change of the MBR; and
    c-4-5) when all entries of the reinsertion node are inserted, completing the reinsertion process, and when any entry of the reinsertion node remains uninserted, returning to the step c-4-4).

10. The method as recited in claim 9, wherein the step c-4-2) includes the step of recording the number of the deleted entries in the current node.

11. The method as recited in claim 9, wherein the step c4-5) includes the steps of:
    c-4-5-1) finding a node to reinsert an entry and determining whether the found node has enough space to insert an entry;
    c-4-5-2) when the result of the step c-4-5-1) is negative, calling a SplitAll process for splitting the found node; and
    c-4-5-3) when the result of the step c-4-5-1) is positive, inserting the entry stored in the reinsertion node into the found node, and then returning to the step c-4-3) for repeating when any change of the MBR of the inserted node occurs.

12. The method as recited in claim 7, wherein the step c-5) includes the steps of:
- c-5-1) assigning a new node and then acquiring an exclusive latch for the new node;
- c-5-2) determining whether the new node is a leaf node;
- c-5-3) when the new node is a leaf node, acquiring an exclusive lock for the new node;
- c-5-4) selecting some entries from the current node, moving the selected entries into the new node, wherein the current node is split to become the new node;
- c-5-6) assigning the NSN of the current node to the NSN of the new node and assigning the LSN of the new node to the NSN of the current node; and
- c-5-7) completing the split process after the exclusive latch and the exclusive lock of the current node and the new node are released.

13. A computer readable medium having computer-executable instructions stored thereon, for performing a method for searching the high-dimensional index tree of a database, wherein the concurrency of the database can be controlled, the method comprising the steps of:
- a) adding a root node to the queue and acquiring the shared lock for reinsertion node;
- b) determining whether the queue is empty or not, fetching a node from the queue and assigning the fetched node as a current node if queue is not empty, releasing the shared lock and terminating the search process if queue is empty;
- c) acquiring the shared latch in the current node, selecting the lower nodes which are within the query range and adding the selected nodes to the queue if current node is not leaf or to the result set if current node is leaf; and
- d) returning to the step b).

14. A computer readable medium having computer-executable instructions stored thereon, for inserting an entry to the high-dimensional index tree of a database, wherein the concurrency of the database can be controlled, the method comprising the steps of:
- a) searching a leaf node to which a new entry is inserted;
- b) determining whether an insert for the new entry to the searched leaf node causes any overflow;
- c) if the result of the step b) is positive, acquiring a tree lock, performing a process for the overflow of the leaf node and then releasing the tree lock; and
- d) if the result of the step b) is negative, inserting the new entry to the leaf node, acquiring a tree lock, changing a MBR and releasing the tree lock.

* * * * *